(12) United States Patent
Nakano

(10) Patent No.: US 6,368,661 B2
(45) Date of Patent: Apr. 9, 2002

(54) METHOD FOR REPAIR COATING

(75) Inventor: Tadashi Nakano, Ninomiya-machi (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 0 days.

(21) Appl. No.: 09/783,601

(22) Filed: Feb. 15, 2001

(30) Foreign Application Priority Data

Feb. 16, 2000 (JP) ........................................ 2000-038535

(51) Int. Cl.⁷ ............................ B05D 3/10; B05D 7/14; B05D 7/16
(52) U.S. Cl. ........................ 427/142; 427/140; 427/410; 427/407.1
(58) Field of Search ................................ 427/140, 142, 427/410, 407.1

(56) References Cited

U.S. PATENT DOCUMENTS

| | | | |
|---|---|---|---|
| 4,555,535 A | * 11/1985 | Bednarek et al. | 524/40 |
| 6,008,314 A | * 12/1999 | Collong et al. | 523/123 |
| 6,017,588 A | * 1/2000 | Watanabe et al. | 427/407.1 |
| 6,045,873 A | * 4/2000 | Adachi et al. | 427/410 |
| 6,187,376 B1 | * 2/2001 | Campbell et al. | 427/142 |

FOREIGN PATENT DOCUMENTS

DE 195 49 298 6/1997

OTHER PUBLICATIONS

Database WPI, Section Ch, Week 197635, Derwent Publications Ltd., London, GB; Class A21, AN 1976–65633X XP002169677—Abstract of JP 51–080337A.

Database WPI, Section Ch, Week 197747, Derwent Publications Ltd., London, GB; Class A21, AN 1977–84039Y XP002169781–13 Abstract of JP 52–123429A.

* cited by examiner

*Primary Examiner*—Shrive P. Beck
*Assistant Examiner*—Jennifer Kolb Michener
(74) *Attorney, Agent, or Firm*—Wenderoth, Lind & Ponack, LLP

(57) ABSTRACT

The present invention provides a method for repair coating characterized by applying an epoxy-polyamine resin base coating composition comprising an epoxy resin having at least one epoxy resin in a molecule and an amine base curing agent as resinous components on a deteriorated coating film which is selected from a tar epoxy resin coating film, a tar urethane resin coating film, a modified epoxy resin coating film, a modified urethane resin coating film, an epoxy-polyamine resin coating film and an epoxy urethane resin coating film and which has a water content of 0.3 to 5% by weight.

12 Claims, No Drawings

METHOD FOR REPAIR COATING

The present invention relates to a method for repair coating which is capable of forming a coating film having a good performance when coated on a deteriorated coating film surface of a coating film formed from a tar epoxy resin coating material, a tar urethane resin coating material, a modified epoxy resin coating material, a modified urethane resin coating material, an epoxy-polyamine resin coating material or an epoxy urethane resin coating material, without removing the deteriorated layer on the deteriorated coating film.

In large size steel structures such as marine vessels and bridges which are exposed to a corrosive environment, high corrosion-protective coating materials such as a tar epoxy resin coating material, a tar urethane resin coating material, a modified epoxy resin coating material, a modified urethane resin coating material, an epoxy-polyamine resin coating material and an epoxy urethane resin coating material are coated on upper structures, decks, holds, ballast tanks, cargo tanks and outside plates of marine vessels; and outside plates, girder outside surfaces and girder inside surfaces of bridges from a viewpoint of corrosion protection.

These large size steel structures have usually as long building and constructing periods as 3 to 24 months, and therefore coating films of a tar epoxy resin coating material, a tar urethane resin coating material, a modified epoxy resin coating material, a modified urethane resin coating material, an epoxy-polyamine resin coating material and an epoxy urethane resin coating material are usually exposed in an outdoor for not much longer than 1 to 12 months.

In general, the coating films of these resin bases are inferior in a weatherability, and a deterioration of the coating films such as discoloration, glaze reduction and chalking is brought about if they are exposed in an outdoor over a long period of time. This deterioration is notably observed in the coating film of a tar epoxy resin coating material or a tar urethane resin coating material.

If a prescribed coating material is applied directly on coating films which are formed by applying the coating materials of the resin bases described above and which are exposed in an outdoor over a long period of time during building, constructing or using and deteriorated, an adhesive property between this applied coating film and the deteriorated coating films is markedly inferior, and therefore brought about is the defect that the problems of cracking and peeling are caused many times during a building, constructing or using period.

With respect to a countermeasure therefor, when a coating material is applied on the deteriorated coating film described above, a deteriorated layer on the surface of the resin base coating film described above is removed by blast treatment or removing treatment using a power tool, a hand tool or high pressure washing, and then a prescribed coating material is applied. However, a lot of labor and cost is required for removing this deteriorated coating film, and therefore strongly desired to be developed are a coating material and a coating method capable of forming a coating film having a good corrosion prevention on the above deteriorated coating film without providing such removing step and causing the problems of cracking and peeling on the above deteriorated coating film.

Further, the coating films of the resin bases described above are deteriorated not only by exposure but also by submerging. If a prescribed coating material is applied on a coating film which is deteriorated by submerging without treating the deteriorated coating film, an adhesive property between the applied coating film and the deteriorated coating films is markedly inferior, so that the problems of cracking and peeling are brought about many times during a building, constructing or using period.

An object of the present invention is to provide a method for repair coating which is capable of forming a coating film having good performances such as an adhesive property even if coated on a deteriorated coating film surface of a coating film formed by applying a tar epoxy resin coating material, a tar urethane resin coating material, a modified epoxy resin coating material, a modified urethane resin coating material, an epoxy-polyamine resin coating material or an epoxy urethane resin coating material, without removing the deteriorated layer on the deteriorated coating film.

The present inventors paid attentions to the fact that in a deterioration phenomenon of a coating film caused by the outdoor exposure or submerging described above, a part of resin components (an epoxy resin, a curing agent and other jointly used resins) contained in the coating film was deteriorated to form a carboxyl group and considered that if the carboxyl group in this deteriorated coating film would be chemically bonded to a part of components of a coating material applied on the deteriorated coating film, an adhesive property between the coating films might be able to be improved. As a result of carrying out various investigations, it has been found, to be unexpected, that the object described above can be achieved by coating an epoxy resin-amine curing agent type coating composition on the deteriorated coating film whose water content is within a certain prescribed range.

Thus, the present invention provides a method for repair coating characterized by applying an epoxy-polyamine resin base coating composition comprising an epoxy resin having at least one epoxy group in a molecule and an amine base curing agent as resinous components on a deteriorated coating film which is selected from a tar epoxy resin coating film, a tar urethane resin coating film, a modified epoxy resin coating film, a modified urethane resin coating film, an epoxy-polyamine resin coating film and an epoxy urethane resin coating film and which has a moisture content of 0.3 to 5% by weight.

The method for repair coating of the present invention shall be explained below in further details.

The method for repair coating of the present invention is characterized by applying the epoxy-polyamine resin base coating composition on a specific kind of a deteriorated coating film having a prescribed moisture content.

In the method for repair coating of the present invention, the deteriorated coating film which is to be repaired is a coating film which is formed by applying a coating composition selected from a tar epoxy resin coating composition, a tar urethane resin coating composition, a modified epoxy resin coating composition, a modified urethane resin coating composition, an epoxy-polyamine resin coating composition and an epoxy urethane resin coating composition and which is exposed to various environments and deteriorated.

All of the tar epoxy resin coating material, the tar urethane resin coating material, the modified epoxy resin coating material, the modified urethane resin coating material, the epoxy-polyamine resin coating material and the epoxy urethane resin coating material each described above can be coating materials which are already known in the coating field of large size steel structures such as marine vessels, bridges and steel towers. The tar epoxy resin coating material includes, for example, a coating material comprising an epoxy resin and tar as resin components. The tar urethane resin coating material includes, for example, a coating material comprising a urethane resin and tar as resin components. The modified epoxy resin coating material includes, for example, a coating material comprising an epoxy resin and a modified resin (for example, a xylene resin, a toluene resin, a ketone resin, a coumarone resin, a petroleum resin, a phenol resin and a dicyclopentadiene resin; a carbonization residue such as tar, pitch and coal digested pitch; and a petroleum distillation residue such as asphalt) as resin components. The modified urethane resin coating material includes, for example, a coating material comprising a urethane resin and the modified resin described above as resin components. The epoxy-polyamine resin coating material includes, for example, a coating material comprising an epoxy resin and a polyamine curing agent as resin components. The epoxy urethane resin coating material includes, for example, a coating material comprising a resin obtained by reacting an epoxy resin with a poly- or mono-isocyanate compound as a resin component.

The surface of a coating film formed by applying a coating material selected from the tar epoxy resin coating material, the tar urethane resin coating material, the modified epoxy resin coating material, the modified urethane resin coating material, the epoxy-polyamine resin coating material and the epoxy urethane resin coating material each described above is liable to be deteriorated by exposing and submerging, and, for example, in a coating film formed from the tar epoxy resin coating material, the tar urethane resin coating material, the modified epoxy resin coating material or the modified urethane resin coating material, deterioration such as discoloration, glaze reduction and chalking is usually advanced to a considerable extent even after exposure of not much longer than one month. In a coating film formed from the epoxy-polyamine resin coating material or the epoxy urethane resin coating material, deterioration is usually advanced to a considerable extent after exposure of not much longer than one year. Carboxyl groups are formed on these coating film surfaces by deterioration.

In coating an epoxy-polyamine base resin which is a repair coating composition according to the method of the present invention, a water content of the deteriorated coating film described above falls preferably in a range of 0.3 to 5% by weight, more preferably 0.6 to 3% by weight. Water may be condensed on a coating film surface as long as a water content of the deteriorated coating film falls in the range described above, but preferred is a state that isolated water is not found on the coating film surface by visual observation. Further, the coating film has a surface resistance falling preferably in a range of 100 KΩ to 100 MΩ, particularly 500 KΩ to 50 MΩ.

In the present invention, "the water content in the coating film" means a water content obtained by measuring a coating film staying in a state that no isolated water is present on the coating film surface by a Karl Fischer's method. When isolated water is present on a surface of a coating film to be measured, the isolated water on the coating film surface is wiped off with paper or cloth having an excellent water-absorbing property to thereby remove this isolated water, and then a water content of the coating film is immediately determined by the Karl Fischer's method.

In the method for repair coating of the present invention, a deteriorated coating film is coated thereon with a repair coating composition if a water content thereof falls in a range of 0.3 to 5% by weight. The deteriorated coating film may be any one of (1) those subjected to washing with water and removing treatment of the deteriorated layer, (2) those subjected to washing with water but no removing treatment of the deteriorated layer and (3) those subjected to no washing with water and no removing treatment of the deteriorated layer. Among them, however, the deteriorated film of (2) or (3) described above which is not subjected removing treatment of the deteriorated film is suited from a viewpoint of a reduction in a number of steps and labor.

Next, the epoxy-polyamine resin base coating composition which comprises an epoxy resin and an amine base curing agent as resinous components and which is applied on the deteriorated film described above according to the method for repair coating of the present invention shall be explained.

Epoxy resin:

The epoxy resin which is a resin component of the coating composition used in the method of the present invention is a resin having at least one epoxy group, preferably at least two epoxy groups on an average and more preferably 2 to 5 epoxy groups on an average in a molecule, and it has suitably a number average molecular weight falling in a range of usually about 250 to about 3,000, preferably about 360 to about 1,000 and an epoxy equivalent falling in a range of usually about 80 to about 1,000, preferably about 180 to about 500.

The epoxy resin described above includes, for example, glycidyl ether type epoxy resins, glycidyl ester type epoxy resins, other glycidyl type epoxy resins and alicyclic epoxy resins; modified epoxy resins based on these epoxy resins; and epoxy group-introduced alkylphenol or alkylphenol novolak type resins prepared by reacting alkylphenol or alkylphenol novolak type resins with epichlorohydrin.

The glycidyl ether type epoxy resins described above include, for example, epoxy resins having a glycidyl ether group which can be obtained by reacting polyhydric alcohols and polyhydric phenols with epihalohydrin or alkylene oxides. Examples of the polyhydric alcohols described above include divalent alcohols such as ethylene glycol, polyethylene glycol, propylene glycol, polypropylene glycol, neopentyl glycol, butylene glycol and hexanediol; trivalent alcohols such as glycerin, trimethylolethane and trimethylolpropane; pentaerythritol, diglycerin and sorbitol. Examples of the polyhydric phenols described above include 2,2-bis(4-hydroxyphenyl)propane-[bisphenol A], 2,2-bis(2-hydroxyphenyl)propane, 2-(2-hydroxyphenyl)-2-(4-hydroxyphenyl)propane, halogenated bisphenol A, bis(4-hydroxyphenyl)methane[bisphenol F], tris(4-hydroxyphenyl)propane, resorcin, tetrahydroxyphenylethane, 1,2,3-tris(2,3-epoxypropoxy) propane, novolak type polyhydric phenols and cresol type polyhydric phenols.

The glycidyl ester type epoxy resins described above include, for example, diglycidyl phthalate, diglycidyl hexahydrophthalate, diglycidyl tetrahydrophthalate and diglycidyl dimerate.

The other glycidyl type epoxy resins described above include, for example, tetraglycidyl aminodiphenylmethane and triglycidyl isocyanurate.

The alicyclic epoxy resins described above include (3,4-epoxy-6-methylcyclohexyl)methyl-3,4-epoxy-6-methylcyclohexane-carboxylate, (3,4-epoxycyclohexyl) methyl-3,4-epoxycyclohexane-carboxylate, bis(3,4-epoxycyclohexylmethyl)adipate, bis(3,4-epoxy-6-methylcyclohexylmethyl)adipate, Epolead GT300 (trade name, trifunctional alicyclic epoxy resin manufactured by Daicel Chemical Industries, Ltd.), Epolead GT400 (trade name, tetrafunctional alicyclic epoxy resin manufactured by Daicel Chemical Industries, Ltd.) and EHPE (trade name, multifunctional alicyclic epoxy resin manufactured by Daicel Chemical Industries, Ltd.).

The modified epoxy resins described above include epoxy resins modified by reacting a non-modified epoxy resin selected from the glycidyl ether type epoxy resins, the glycidyl ester type epoxy resins, the other glycidyl ether type epoxy resins and the alicyclic epoxy resins each described above with a modifying agent such as alkylphenols, fatty acids, phosphoric acid and acryl resins. The non-modified epoxy resins described above have suitably an epoxy equivalent of about 250 or less, particularly 180 to 200 on an average.

The alkylphenol capable of being used as the modifying agent described above is preferably phenol having an alkyl group having 2 to 18 carbon atoms, and specific examples thereof include p-t-butylphenol, p-octylphenol and nonylphenol. The fatty acids capable of being used as the modifying agent described above are suitably drying oil fatty acids and semi-drying oil fatty acids, and specific examples thereof include linseed oil fatty acid, safflower oil fatty acid, soybean oil fatty acid, sesame oil fatty acid, eno oil fatty acid, hemp-seed oil fatty acid, grapestone oil fatty acid, tung oil fatty acid, corn oil fatty acid, sunflower oil fatty acid, cotton seed oil fatty acid, walnut oil fatty acid, gum seed oil fatty acid, oiticica oil fatty acid, fish oil fatty acid, high diene fatty acid, tall oil fatty acid and dehydrated castor oil fatty acid. The alkylphenols and the fatty acids described above which are modifying agents can be used alone or in a mixture of two or more kinds thereof.

Among them, aromatic epoxy resins having glycidyl ether groups are suited for the epoxy resin used in the coating composition according to the present invention.

Amine base curing agent:

The amine base curing agent which is a part of the resin component in the epoxy-polyamine resin type coating composition used in the method of the present invention works as a curing agent for the epoxy resin described above and can be a compound having at least two amino groups or groups capable of being converted into amino groups when coming in contact with water.

The amine base curing agent includes, for example, aliphatic polyamines such as ethylenediamine, propylenediamine, butylenediamine, hexamethylenediamine, diethylenetriamine, triethylenetetramine, tetraethylenepentamine, pentaethylenehexamine and diethylaminopropylamine; alicyclic polyamines such as 1,3-bis-aminomethylcyclohexane and isophoronediamine; aromatic polyamines such as xylilenediamine, metaxylenediamine, diaminodiphenylmethane and phenylenediamine; and modified compounds of these polyamines, for example, polyamides, polyamideamines, amine adducts with epoxy compounds, Mannich compounds, Michaelis adducts, ketimines and aldimines. Glycidyl ether type epoxy resins having a number average molecular weight of 300 to 1000 can suitably be used as the epoxy compounds constituting the adducts described above. Among them, polyamides of polyamines selected from diethylenetriamine, triethylenetetramine, tetraethylenepentamine and metaxylenediamine; amine adducts of these polyamines with epoxy compounds; and the Mannich compounds of metaxylenediamine are preferred.

A blending proportion of the epoxy resin described above to the amine base curing agent described above in the epoxy-polyamine resin type coating composition described above shall not specifically be restricted. Usually, they are suitably used in such a proportion that active hydrogens bonded to amino groups (including generated amino groups) contained in the amine base curing agent fall in total in a range of 0.5 to 5 equivalents, preferably 0.6 to 3 equivalents per one equivalent of the epoxy groups contained in the epoxy resin.

Epoxy-polyamine resin type coating composition:

The epoxy-polyamine resin base coating composition described above used in the present invention is a coating composition of an organic solvent type or non-solvent type comprising the epoxy resin and the amine base curing agent each described above as the resinous components, and in the case of the organic solvent type coating composition, the coating composition further comprises an organic solvent in addition to these essential components.

Any organic solvents can be used without specific restrictions as long as they can dissolve or disperse the above epoxy resin and amine base curing agent. Specific examples of the organic solvent include, for example, hydrocarbon base solvents such as xylene, toluene, VM & P naphtha, mineral spirit, solvent kerosene, aromatic naphtha, solvent naphtha, Solvesso 100, Solvesso 150 and Solvesso 200 ("Solvesso" is the registered trade name of Esso Oil Co., Ltd.), Swasol 310, Swasol 1000 and Swasol 1500 ("Swasol" is the registered trade name of Cosmo Oil Co., Ltd.), n-butane, n-hexane, n-heptane, n-octane, isononane, n-decane, n-dodecane, cyclopentane, cyclohexane and cyclobutane; ketones such as acetone, methyl ethyl ketone, methyl isobutyl ketone, cylohexanone and isophorone; ester base solvents such as ethyl acetate, butyl acetate, ethylene glycol monomethyl ether acetate, ethylene glycol monoethyl ether acetate and diethyl succinate; ether alcohol base solvents such as ethylene glycol monoethyl ether, ethylene glycol monobutyl ether and diethylene glycol monoethyl ether; and alcohol base solvents such as ethanol, isopropanol, n-butanol and isobutanol. These organic solvents can be used alone or in a mixture of two or more kinds thereof.

The epoxy-polyamine resin type coating composition used in the method of the present invention can contain, in addition to the epoxy resin, the amine base curing agent and the optional organic solvent (in the case of the organic solvent type) described above, if necessary, other resins; metal powder such as zinc powder and aluminum powder; pigments such as a color pigment, an extender pigment and a corrosion preventive pigment; and an additive such as a defoaming agent, a leveling agent, a thickener, a plasticizer, a filler and a dispersant.

The other resins described above include resins which are usually blended with a coating material, for example, a modified epoxy resin having no epoxy groups, a xylene resin, a toluene resin, a ketone resin, a coumarone resin, a petroleum resin, a phenol resin and a dicyclopentadiene resin; a carbonization residue such as tar, pitch and coal digested pitch; and a petroleum distillation residue such as asphalt. They are used for modifying the coating film. These other resins can be blended alone or in combination of two or more kinds thereof.

The modified epoxy resin having no epoxy groups described above is a resin which is derived from an epoxy resin and has no epoxy groups taking part in curing and includes, for example, a urethane-modified epoxy resin, an amine-modified epoxy resin and a dimer-modified epoxy resin. Among them, the urethane-modified epoxy resin includes, for example, resins prepared by further reacting a poly- or mono-isocyanate compound with amine-added epoxy resins obtained by reacting an epoxy resin with amines.

Compounds which are solid at a room temperature and have a melting point falling in a range of 60° C. or higher, preferably 70 to 140° C. can suitably be used as the xylene resin, the toluene resin, the ketone resin, the coumarone resin, the petroleum resin, the phenol resin and the dicyclopentadiene resin; the carbonization residue such as tar, pitch and coal digested pitch; and the petroleum distillation residue such as asphalt each described above.

Re-painting (Repairing):

The epoxy-polyamine resin type coating composition described above can be applied on the deteriorated coating film surface of the coating material described above by means of a conventional method such as, for example, brush coating, roller coating, spray coating, electrostatic coating and various coater coatings.

A coating amount of the epoxy-polyamine resin type coating composition, which is applied according to the method of the present invention on the deteriorated coating film having a water content within the above-prescribed range, shall not strictly be restricted and can be changed according to the kind and the condition of a surface to be coated. In general, it falls suitably in a range of about 5 to about 100 μm, preferably about 10 to about 50 μm in terms of a cured film thickness in the case of a clear coating material and about 10 to about 500 μm, preferably about 40 to about 250 μm in terms of a cured film thickness in the case of a coating material containing a pigment.

A formed coating film is cured usually by leaving standing at a room temperature but can be cured as well, if necessary, by heating to a temperature of up to about 80° C. according to the kind of the amine base curing agent used.

Further, a top coating material can be applied, if necessary, on a coating film formed by applying and drying the epoxy-polyamine resin type coating composition described above. This top coating material shall not specifically be restricted, and conventionally known top coating materials can be used. Capable of being used are, for example, coating materials of an alkyd resin base, a chlorinated rubber base, an epoxy resin base, a silicon alkyd resin base, a urethane resin base, a silicon acryl resin base and a fluororesin base.

If the epoxy-polyamine resin type coating composition as above-described is applied on the deteriorated coating film having a water content within the above-prescribed range, a coating film which has a good adhesive property and does not cause cracking and peeling during a building, constructing or using period and which has a good coating film performance can be formed without subjecting the deteriorated coating film to surface treatment (blast treatment or such various removing treatments as described above).

A reason why the epoxy-polyamine resin type coating composition shows an excellent adhesive property to the deteriorated coating film described above in the present invention is not accurately known, but the present inventors assume that it is due to the fact that according to, for example, the following reaction equation:

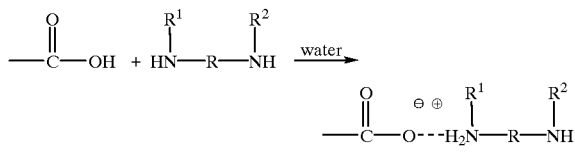

wherein R represents a residu of the amine base curing agent, $R^1$ and $R^2$ are the same or different and each represent a hydrogen atom or a hydrocarbon group such as an alkyl group or an allyl group, moisture contained in the deteriorated coating film acts as a catalyst for a salt-forming reaction of a carboxyl group in the deteriorated coating film with an amino group of the amine base curing agent which is contained in the epoxy-polyamine resin type coating composition applied on the deteriorated coating film, to accelerate the salt-forming reaction described above and that this salt formation contributes to a rise in the adhesive property.

The present invention shall more specifically be explained below with reference to examples. "Parts" and "%" are based on weight unless otherwise described.

Preparation method of coated plate:

Coatd on a cold finished mild steel plate so that the dried film thickness became 100 μm was a coating composition selected from a tar epoxy resin coating composition (trade name "Eposeal 6000PS", manufactured by Kansai Paint Co., Ltd.), a tar urethane resin coating composition (trade name "Eposeal 6000PW", manufactured by Kansai Paint Co., Ltd.), a modified epoxy resin coating composition (trade name "Epomarine EX21", manufactured by Kansai Paint Co., Ltd.), a modified urethane resin coating composition (trade name "Epomarine JW winter type", manufactured by Kansai Paint Co., Ltd.), an epoxy-polyamine resin coating composition (trade name "Epomarine EX500", manufactured by Kansai Paint Co., Ltd.) and an epoxy-urethane resin coating composition (trade name "Epomarine EX600W", manufactured by Kansai Paint Co., Ltd.), and it was dried in a room of a temperature of 20° C. and a humidity of 65% RH for 7 days to prepare plural coated plates per each coating material. After these coated plates were exposed in an outdoor on the seashore for 30 days, they were immersed in top water for 10 days and then pulled up. Subsequently, the coated plates pulled up were dried for optional drying time to prepare coated plates having coating films of various water contents. The water contents of the coating films in these coated plates were determined by a Karl Fischer's method.

EXAMPLE 1

Adjusted to a viscosity of about 2000 mPa.s (millipascal.second) were respective coating materials of a tar epoxy resin coating composition (trade name "Eposeal 6000PS", manufactured by Kansai Paint Co., Ltd., comprising a bisphenol A type epoxy resin having at least one epoxy group in a molecule, a polyamideamine resin and a tar as resinous components), a modified epoxy resin coating composition (trade name "Epomarine EX21", manufactured by Kansai Paint Co., Ltd., comprising a bisphenol A type epoxy resin having at least one epoxy group in a molecule, polyamide, a Mannich compound and a petroleum resin as resinous components) and an epoxy resin coating composition (trade name "Epomarine EX500", manufactured by Kansai Paint Co., Ltd., comprising a bisphenol A type epoxy resin having at least one epoxy group in a molecule, a polyamideamine resin, an amine adduct of an epoxy compound and a Mannich compound as resinous components). They were applied by an air spray method on a coated plate which was the tar epoxy resin coating composition-coated plate prepared in the manner described above having a water content of 0.6% in the coating film so that the dried film thickness became 100 μm, and they were dried in a room of a temperature of 20° C. and a humidity of 65% RH for 7 days to prepare three kinds of coated plates.

EXAMPLES 2 TO 15 AND COMPARATIVE EXAMPLES 1 TO 3

Various coating compositions were coated on the coating films of the coated plates having various water contents obtained by the preceding preparing method of the coated plate in the same manner as in Example 1 to obtain respective coated plates.

The respective coated plates in Examples 1 to 15 and Comparative Examples 1 to 3 were subjected to various tests based on the following test methods. The test results thereof are shown Table 1 described later.

Test Methods

Adhesive property:

Each longitudinal and lateral 6 lines of crossing scratches which reached the substrates were provided on the coated plates by means of a knife to form grids having 25 squares of 5 mm square. Subsequently, a cellophane adhesive tape was tightly adhered on these cross-cut parts and then peeled off in a moment to evaluate the number of the cross-cuts which were not peeled off and remained on the coated plates based according to the following criteria:

⊚: all 25 cross-cuts remain without peeling off

O: 20 to 24 cross-cuts remain

Δ: 10 to 19 cross-cuts remain

X: 9 cross-cuts or less remain

Cissing resistance:

The degree of cissing of the coating film in the coated plate were evaluated by visual observation according to the following criteria:

O: no generation of cissing is observed

Δ: a little generation of cissing is observed

X: considerable generation of cissing is observed

Moisture resistance:

The coated plate was left standing in a blister box of 50° C. and a relative humidity of 95% RH or more for 30 days, and then a degree of blister on the coating film after left standing was evaluated by visual observation according to the following criteria:

O: no production of blisters on the coating film is observed

Δ: a little production of blisters on the coating film is observed

X: considerable production of blisters on the coating film is observed

TABLE 1

| | | Example | | | | | | | | |
|---|---|---|---|---|---|---|---|---|---|---|
| | | 1 | 2 | 3 | 4 | 5 | 6 | 7 | 8 | 9 |
| Coating composition for forming deteriorated coating film | | Tar epoxy resin coating composition Eposeal 6000PS | | | Tar urethane resin coating composition Eposeal 6000PW | | | Modified epoxy resin coating composition Epomarine EX21 | | |
| Water content (% by weight) in deteriorated coating film | | 0.6 | 2.5 | 5 | 0.3 | 1.6 | 3.8 | 0.8 | 1.9 | 4.5 |
| Adhesive property | Tar epoxy resin coating composition Eposeal 6000PS | ⊚ | ⊚ | ⊚ | O | ⊚ | ⊚ | ⊚ | ⊚ | ⊚ |
| | Modified epoxy resin coating composition Epomarine EX21 | ⊚ | ⊚ | ⊚ | O | ⊚ | ⊚ | ⊚ | ⊚ | ⊚ |
| | Epoxy resin coating composition Epomarine EX500 | ⊚ | ⊚ | ⊚ | ⊚ | ⊚ | ⊚ | ⊚ | ⊚ | ⊚ |
| Cissing resistance | Tar epoxy resin coating composition Eposeal 6000PS | O | O | O | O | O | O | O | O | O |
| | Modified epoxy resin coating composition Epomarine EX21 | O | O | O | O | O | O | O | O | O |
| | Epoxy resin coating composition Epomarine EX500 | O | O | O | O | O | O | O | O | O |
| Moisture resistance | Tar epoxy resin coating composition Eposeal 6000PS | O | O | O | O | O | O | O | O | O |
| | Modified epoxy resin coating composition Epomarine EX21 | O | O | O | O | O | O | O | O | O |
| | Epoxy resin coating composition Epomarine EX500 | O | O | O | O | O | O | O | O | O |

| | | Example | | | | | | Comparative Example | | |
|---|---|---|---|---|---|---|---|---|---|---|
| | | 10 | 11 | 12 | 13 | 14 | 15 | 1 | 2 | 3 |
| Coating composition for forming deteriorated coating film | | Modified urethane resin coating composition Epomarine JW winter type | | Epoxy-polyamine resin coating composition Epomarine EX500 | | Epoxy urethane resin coating composition Epomarine EX600W | | Tar epoxy resin coating composition Eposeal 6000PS | | |
| Water content (% by weight) in deteriorated coating film | | 1.2 | 2.5 | 1.5 | 2.8 | 0.4 | 4.5 | 0.1 | 6.8 | 9.5 |
| Adhesive property | Tar epoxy resin coating composition Eposeal 6000PS | ⊚ | ⊚ | ⊚ | ⊚ | O | ⊚ | X | ⊚ | Δ |
| | Modified epoxy resin coating composition Epomarine EX21 | ⊚ | ⊚ | ⊚ | ⊚ | O | ⊚ | X | ⊚ | Δ |
| | Epoxy resin coating composition Epomarine EX500 | ⊚ | ⊚ | ⊚ | ⊚ | ⊚ | ⊚ | X | ⊚ | Δ |
| Cissing resistance | Tar epoxy resin coating composition Eposeal 6000PS | O | O | O | O | O | O | O | Δ | X |
| | Modified epoxy resin coating | O | O | O | O | O | O | O | Δ | X |

TABLE 1-continued

| | | | | | | | | | | | |
|---|---|---|---|---|---|---|---|---|---|---|---|
| tance | composition Epomarine EX21 | | | | | | | | | | |
| | Epoxy resin coating composition Epomarine EX500 | ○ | ○ | ○ | ○ | ○ | ○ | ○ | △ | X |
| Moisture resistance | Tar epoxy resin coating composition Eposeal 6000PS | ○ | ○ | ○ | ○ | ○ | ○ | ○ | △ | X |
| | Modified epoxy resin coating composition Epomarine EX21 | ○ | ○ | ○ | ○ | ○ | ○ | ○ | △ | X |
| | Epoxy resin coating composition Epomarine EX500 | ○ | ○ | ○ | ○ | ○ | ○ | ○ | △ | X |

As apparent from the results shown in Table 1, the method for repair coating of the present invention makes it possible to form a coating film having no deterioration in an adhesive property which has so far been a problem and having good appearance and coating film performance even if the coating composition for repair is coated on a deteriorated coating film which is formed by applying a tar epoxy resin coating composition, a tar urethane resin coating composition, a modified epoxy resin coating composition, a modified urethane resin coating composition, an epoxy-polyamine resin coating composition or an epoxy urethane resin coating composition without subjecting the deteriorated coating film to removing treatment of the deteriorated layer. The method for repair coating of the present invention makes it possible to omit removing treatment of the deteriorated coating film, so that a lot of labor and expenses which have so far been required for a step of removing the deteriorated layer can be saved.

What is claimed is:

1. A method for repair coating characterized by applying an epoxy-polyamine resin base coating composition comprising an epoxy resin having at least one epoxy group in a molecule and an amine base curing agent as resinous components on a deteriorated coating film which is selected from a tar epoxy resin coating film, a tar urethane resin coating film, a modified epoxy resin coating film, a modified urethane resin coating film, an epoxy-polyamine resin coating film and an epoxy urethane resin coating film, said deteriorated coating film having a water content of 0.3 to 5% by weight.

2. The method for repair coating according to claim 1, wherein the deteriorated coating film has a water content of 0.6 to 3% by weight.

3. The method for repair coating according to claim 1, wherein the epoxy-polyamine resin base coating composition is applied on the deteriorated coating film without subjecting the surface of the deteriorated coating film to removing treatment of the deteriorated layer.

4. The method according to claim 1, wherein the epoxy resin has a number average molecular weight falling in a range of 250 to 3,000 and an epoxy equivalent falling in a range of 80 to 1,000.

5. The method according to claim 1, wherein the epoxy resin has a number average molecular weight falling in a range of 360 to 1,000 and an epoxy equivalent falling in a range of 180 to 500.

6. The method according to claim 1, wherein the epoxy resin is selected from the group consisting of glycidyl ether type epoxy resins, glycidyl ester epoxy resins, other glycidyl epoxy resins and alicyclic epoxy resins; modified epoxy resins based on these epoxy resins; and epoxy group-introduced alkylphenol or alkylphenol novolak resins prepared by reacting alkylphenol or alkylphenol novolak resins with epichlorohydrin.

7. The method according to claim 1, wherein the epoxy resin is an aromatic epoxy resin having a glycidyl ether group.

8. The method according to claim 1, wherein the amine base curing agent is selected from the group consisting of aliphatic polyamines, alicyclic polyamines, aromatic polyamines, and polyamides, polyamideamines, amine adducts with epoxy compounds, Mannich compounds, Michaelis adducts, ketimines and aldimines of these polyamines.

9. The method according to claim 1, wherein the amine base curing agent is selected from the group consisting of ethylenediamine, propylenediamine, butylenediamine, hexamethylenediamine, diethylenetriamine, triethylenetetramine, tetraethylenepentamine, pentaethylenehexamine, diethylaminopropylamine, 1,3-bisaminomethylcyclohexane, isophoronediamine, xylilenediamine, metaxylenediamine, diaminodiphenylmethane, phenylenediamine, polyamides, polyamideamines, amine adducts with epoxy compounds, Mannich compounds, Michaelis adducts, ketimines and aldimines of these polyamines.

10. The method according to claim 1, wherein the amine base curing agent is polyamide of polyamine selected from diethylenetriamine, triethylenetetramine, tetraethylenepentamine and metaxylenediamine; an amine adduct of these polyamines with an epoxy compound; or a Mannich compound of metaxylenediamine.

11. The method according to claim 1, wherein the amine base curing agent is contained in such a proportion that active hydrogens bonded to amino groups contained in the amine base curing agent fall in total in a range of 0.5 to 5 equivalents per one equivalent of the epoxy groups contained in the epoxy resin.

12. The method according to claim 1, wherein the epoxy-polyamine resin base coating composition further comprises, as a resin component, at least one resin selected from a modified epoxy resin having no epoxy groups, a xylene resin, a toluene resin, a ketone resin, a coumarone resin, a petroleum resin, a phenol resin, a dicyclopentadiene resin, tar, pitch, coal digested pitch and asphalt.

* * * * *